United States Patent [19]
Boston et al.

[11] Patent Number: 6,076,079
[45] Date of Patent: Jun. 13, 2000

[54] ELECTRONIC TIP CALCULATOR

[76] Inventors: Bob Boston; Barbara Boston, both of 2700 Newport Blvd., Suite 168, Newport Beach, Calif. 92663

[21] Appl. No.: 08/900,527

[22] Filed: Jul. 25, 1997

[51] Int. Cl.[7] .................................................. G06F 15/02
[52] U.S. Cl. ........................... 705/400; 708/106; 705/15
[58] Field of Search .............................. 705/15, 16, 19, 705/25, 41, 400, 402, 410, 411, 416, 500; 364/705, 700, 708, 709, 710, 464; 708/106, 142, 160; 361/683

[56] References Cited

U.S. PATENT DOCUMENTS

| | | |
|---|---|---|
| 3,781,865 | 12/1973 | Yamazaki . |
| 3,917,934 | 11/1975 | Goto . |
| 3,940,758 | 2/1976 | Margolin ................................ 345/169 |
| 4,014,013 | 3/1977 | McElroy . |
| 4,075,702 | 2/1978 | Davies ..................................... 708/106 |
| 4,087,861 | 5/1978 | Futagawa et al. . |
| 4,264,963 | 4/1981 | Leach . |
| 4,423,321 | 12/1983 | Wilkow . |
| 4,458,320 | 7/1984 | Sutton ..................................... 705/400 |
| 4,535,416 | 8/1985 | Kano et al. . |
| 4,838,579 | 6/1989 | McRoberts . |
| 4,847,760 | 7/1989 | Yagi . |
| 5,093,760 | 3/1992 | Bedol ...................................... 361/683 |
| 5,130,939 | 7/1992 | Yoshino . |
| 5,381,353 | 1/1995 | Oba . |
| 5,530,234 | 6/1996 | Loh et al. ............................. 235/61 R |
| 5,604,688 | 2/1997 | Chu et al. ................................ 708/160 |
| 5,864,335 | 1/1999 | Kuzunuki et al. ....................... 345/173 |

FOREIGN PATENT DOCUMENTS

| | | |
|---|---|---|
| 56-157552 | 12/1981 | Japan .............................. G06F 15/02 |
| 2-76325 | 3/1990 | Japan . |
| 1767510 A1 | 12/1990 | Russian Federation . |

OTHER PUBLICATIONS

MAPP Introduces New Terminals and Software for Restaurants and Mail Order Industry. "PR Newswire." Sep. 19, 1989, pp. 1–4.

Verifone Folia(TM) Brings Credit and Debit Card Payment to the Restaurant Table. PR Newswire. May 16, 1994;;. 1–6.

*Primary Examiner*—James P. Trammell
*Assistant Examiner*—John Leonard Young
*Attorney, Agent, or Firm*—Knobbe, Martens, Olson & Bear, LLP

[57] ABSTRACT

An electronic calculating device for conveniently calculating a percentage of a value, as is often performed in a restaurant or bar when calculating a gratuity based on the amount of a bill is provided. The invention is a device having a first side and a second side, with a control mechanism on the first side which the server or diner can use to input a bill amount. A control mechanism is positioned on the second side for causing a processor to calculate a percentage value of the bill amount. Preferably, a display is provided for displaying the percentage value or tip amount, as well as the total of the tip and the amount of the bill.

17 Claims, 2 Drawing Sheets

ELECTRONIC TIP CALCULATOR

FIELD OF THE INVENTION

The present invention relates to calculating devices and, more particularly, to a simple apparatus and method for calculating the percentage of an amount.

BACKGROUND OF THE INVENTION

It is often customary for a patron of a restaurant, bar, or other establishment having a service provider to give a gratuity or a tip to the service provider. For example, food and cocktail servers, hair stylists, and other personal service providers often receive a tip directly from the party they are serving. Historically, the tip is an amount equal to a percentage of the total bill amount. The tip amount generally ranges from ten to twenty percent of the total bill amount, with fifteen and twenty percent being the most common tip percentage amounts.

Difficulty can arise when a dining patron, presented with the bill, must perform a mathematical computation to determine the proper tip amount. Although some individuals can easily calculate the percentage of a number, others have a much more difficult time. This is especially true when the percentage amount to be calculated is not a multiple of five, i.e. ten, fifteen or twenty percent. In addition, many dining patrons are uncomfortable performing a possibly embarrassing mathematical computation in front of a table full of dining guests. Likewise, the service provider is always appreciative of being given the proper tip amount, especially since many individuals tip too low if they do not know the proper amount to give.

Other methods and devices are known which could provide relief to those calculating tips, but none of these methods and devices have worked satisfactory. A common calculator, having a wide array of functions and buttons, suffers from being too complicated for most dining patrons to master in a short, single use experience. Similarly, multi-function calculators are too expensive for widespread use such as being enclosed in each restaurant check folio.

Another option would be to provide a writing implement and paper for the dining patron so that they may perform the calculation long hand. However, this option still requires the diner to perform mathematical calculations, an unpleasant or impossible option for many. Further these methods do not always provide accurate results.

Finally, others have proposed using a chart showing the corresponding tip amount for various bill amounts. However, this suffers from the drawback of not always presenting the bill amount on the chart, or alternatively, not providing the data for the percentage that the diner feels is appropriate. Finally, if all the required information is provided, the print becomes small and unreadable or the document becomes unreasonably large and bulky.

SUMMARY OF THE INVENTION

In accordance with the present invention, a compact electronic calculating device is provided. The calculating device, upon receiving a number from an operator, provides the percentage of that number, the percentage calculated being determined by the operator's percentage selection. The operator may chose from a preprogrammed fifteen (15) percent selection, a preprogrammed twenty (20) percent selection or increasing or decreasing the percentage amount in integer increments.

In particular, the calculating device has a first and second side. The first side contains an "on" and an "off" button that allow the operator to energize or de-energize the unit. A "clear" button, also located on the first side, allows the operator to clear the amount in the internal electronic processor circuitry. Also located on the first side are ten buttons each sequentially labeled with a digit zero through nine (0 to 9) that allow the operator to enter the amount of the restaurant or bar bill, or any bill, charge or number, into the internal electronic processor circuitry. Each button, when depressed will enter into the electronic processor circuitry a value that corresponds to the number displayed on the button. The decimal point is automatically placed two decimal places in from the right creating accuracy to hundredths of a dollar, i.e. cents. A display screen, also located on the first side, shows the number entered by the operator.

Advantageously, the device of this invention has a second side. In a preferred embodiment of this invention, the first side contains a raised surface on the first side that is of sufficient height to prevent the first side buttons from being actuated by a supporting surface that the calculating device may be placed on. The raised surface may be of a variety of shapes and in a variety of locations, but is preferably a raised ledge extending about the periphery of the first side.

The second side contains additional buttons which allow the operator to select a predetermined percentage value, preferably fifteen (15) or twenty (20) percent, which the processor circuitry will use to calculate the percentage of the entered value. Additionally, the operator may use a MORE button or a LESS button to increase or decrease, in single integer increments, the percentage value that the processor circuitry will use in the calculation.

Also located on the second side are several display screens. One display screen shows the percentage amount that the operator has selected. Another display shows the amount that the operator has entered, the amount being identical to the amount displayed on the first side. A third display screen shows the amount of the tip calculated by the processor circuitry, i.e. the tip amount. Finally, a display screen presents the sum of the amount entered on the first side and the operator selected percentage of that number. This final value represents the total bill, which is equivalent to the cost of the meal (bill amount) plus gratuity (tip).

The internal electronic processor means is of the type common in the industry for simple mathematical computation. Several such configurations could be envisioned by those skilled in the art.

It is a further object of the present invention to provide means for back or side lighting of the displays so that the displays remain viewable in dim lighting conditions.

It is a further object of the present invention to maintains its physical dimensions such that it may conveniently fit within a folder in which restaurants and bars often present the dinner and drink charges.

It is a further object of the invention to maintain its power consumption to a minimum to extend battery life and to have an automatic timed power shut down to further preserve battery life.

It is a further object of the invention to provide quick and convenient access to the battery so that the battery may be changed without the aid of a trained off-site technician.

Further objects, features, and advantages of the present invention over the prior art will become apparent from the detailed description of the drawings which follow, when considered with the attached figures.

BRIEF DESCRIPTION OF THE DRAWINGS

In the accompanying drawings wherein one of the possible exemplary embodiments of the invention is shown.

DETAILED DESCRIPTION OF THE PREFERRED EMBODIMENTS

Figure 1:
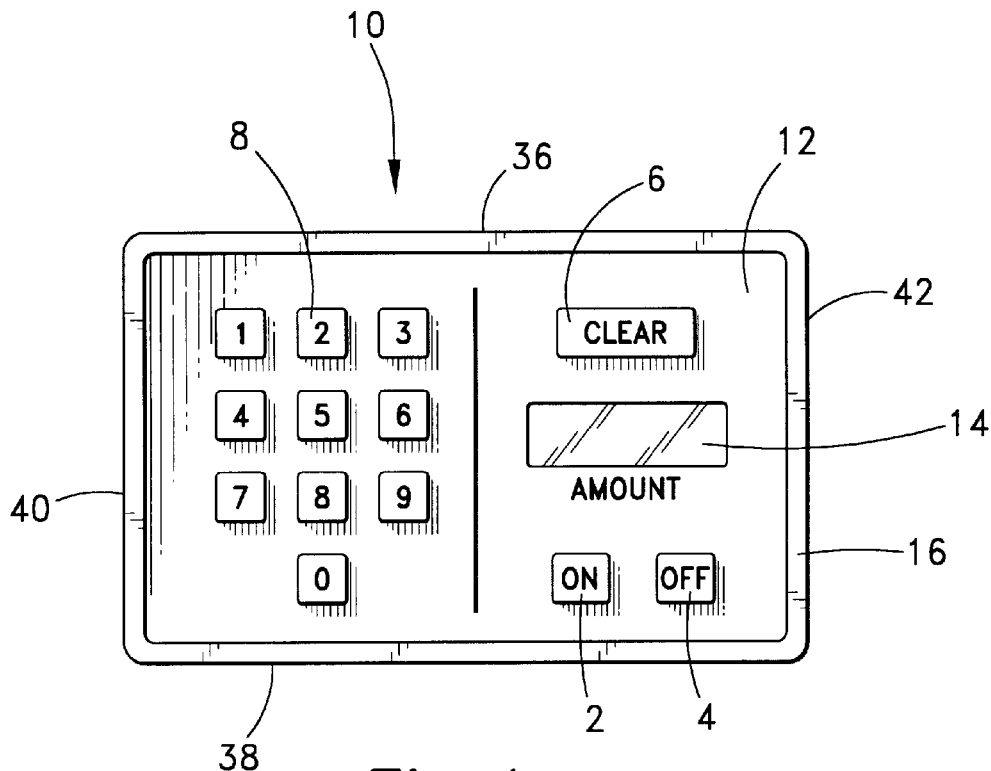
FIG. 1 is a top plan view of the calculating device.

Referring now in detail to the drawings, FIG. 1 provides a plan view of calculating device 10. The calculating device, in its preferred embodiment, comprises a generally rectangular housing having opposing first and second sides 12, 18. Both the first side 12 and the second side 18 are mated with a first edge 36 and second edge 38 opposing each other and extending generally parallel to each other while a third edge 40 and a fourth edge 42 oppose each other and extend generally parallel to each other but perpendicular to the first edge 36 and the second edge 38.

The device 10 includes an electrically operated control unit (not shown) positioned within the housing. The control unit includes calculating or processor means, as described in more detail below.

Figure 3:
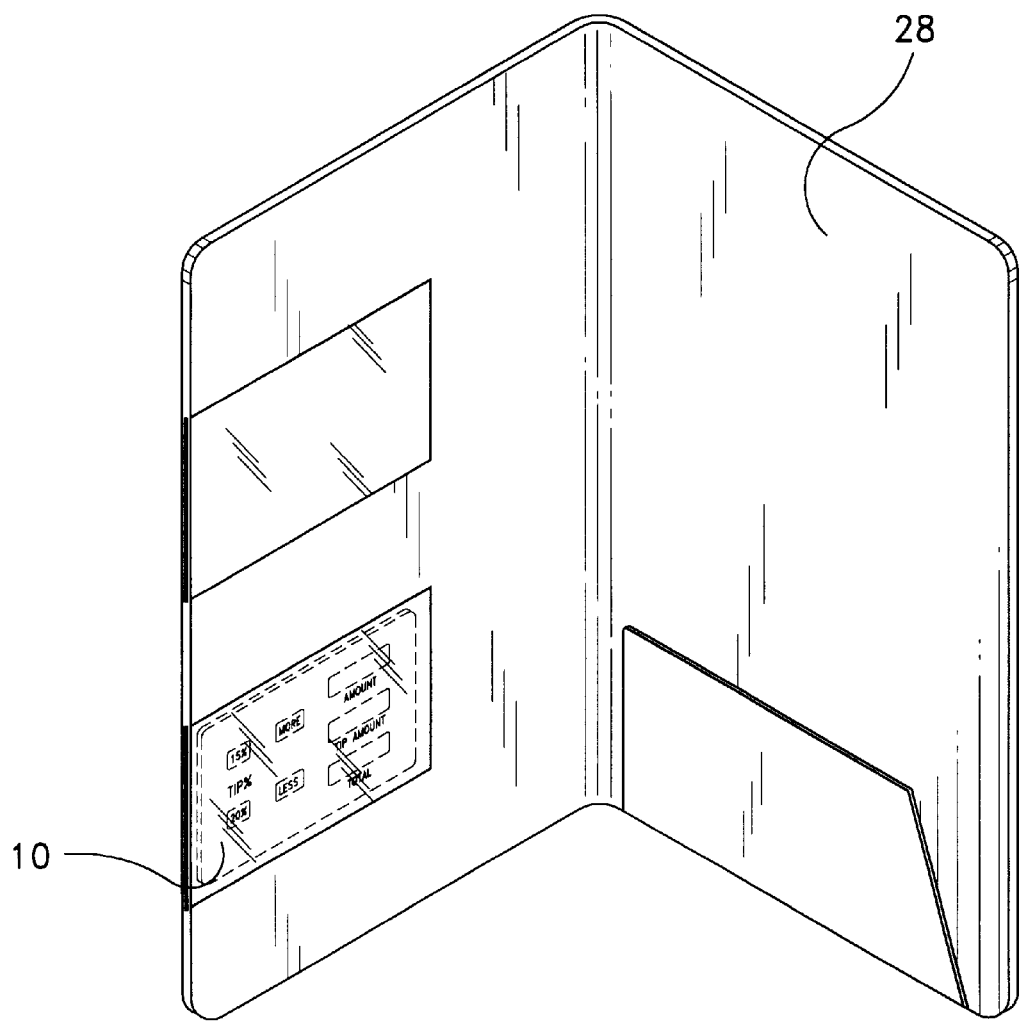
FIG. 3 illustrates the preferred embodiment of the invention used in conjunction with a folder of the type often used in restaurants for presenting meal charges to dining patrons.

The calculating device 10 is most preferably battery powered thereby allowing the invention to be portable and convenient to use. Referring to FIG. 3, the dimensions of the device 10 of the preferred embodiment allow the calculating device 10 to fit within a compartment for use within a folder 28 as is often used in restaurants for presenting meal charges to dining patrons. The calculating device 10 is preferably about the size of a standard credit card. Preferably, the distance between the third edge 40 and the fourth edge 42 is three to four inches, the distance between the first edge 36 and the second edge 38 is two to three inches and the distance between the first side 12 and the second side 18 is 0.25 inch to 0.5 inch.

The first side 12, as seen in FIG. 1, includes means for controlling the operation of the calculating device 10. The first side 12 contains first 2, second 4, and third 6 calculating device control means. The calculating device control means 2, 4, 6 may be flat surface or raised surface push buttons, heat sensitive surfaces, electrical conduction based devices, data entry levers or knobs or other forms of data entry devices or control devices as commonly known by those with skill in the art. The preferred embodiment comprises flat surface or raised surface push buttons.

The first calculating device control means 2 preferably comprises a button for energizing the calculating device 10. The first calculating device control means 2 is preferably labeled "ON" but could be assigned various labels as appropriate and known by those with skill in the art. The second calculating device control means 4 preferably comprises a button for de-energizing the calculating device 10. The second calculating device control means is preferably labeled "OFF" but could be assigned various labels as appropriate and known by those with skill in the art. The third calculating device control means 6 preferably comprises a button which when actuated removes any residual values in the processor circuitry. The third calculating device control means 6 is preferably labeled "CLEAR" but could be assigned various labels as appropriate and known by those with skill in the art.

Numeric data entry means 8 may be flat surface or raised surface push buttons, heat sensitive surfaces, electrical conduction based devices, data entry levers or knobs or other forms of data entry devices or control devices as commonly known by those with skill in the art. The preferred embodiment comprises flat surface or raised surface push buttons wherein the button, when depressed, causes an electrical connection to be made thereby signaling the processor circuitry. The numeric data entry means 8 preferably comprises ten buttons, each button preferably being sequentially labeled with one of the numbers zero through nine. The numeric data entry means 8 provides means for an operator to enter numeric values into the processing circuitry. As described above, the processor circuitry is sized and arranged to fit within the housing of calculating device 10, as will be understood by those of skill in the art.

Also located on the first side 12 is a first side AMOUNT display screen 14. The first side AMOUNT display screen 14 may consist of many types of display devices as known to those with skill in the art. Preferably, the display screens comprise liquid crystal display (LCD) screens or light emitting diode (LED) screens. All display means in the present invention are controlled and powered by the control unit or processor circuitry inside the calculating device 10. All display means in the present invention are preferably sized to create a large display thereby making it easy for the operator to view the display. All display means in the present invention are preferably back or side lit thereby making it easy for the operator to view the amount display screen in dimly lit conditions.

The first side 12 preferably contains support means 16 to elevate the first side a sufficient distance to prevent the first side control means 2, 4, 6, and the numeric data entry means 8 from contacting a surface supporting the calculating device 10. Possible support means include legs, half spheres, ridges, protruding shoulders or other such protruding structures. Preferably, the support means comprise a raised ledge 16 skirting the first 36, second 38, third 40, and fourth 42 edges of the first surface 12 of the calculating device 10. The ledge 16 prevents supporting structure such as a table or folder 28 (FIG. 3) from disadvantageously altering the amount input into the device 10.

Figure 2:
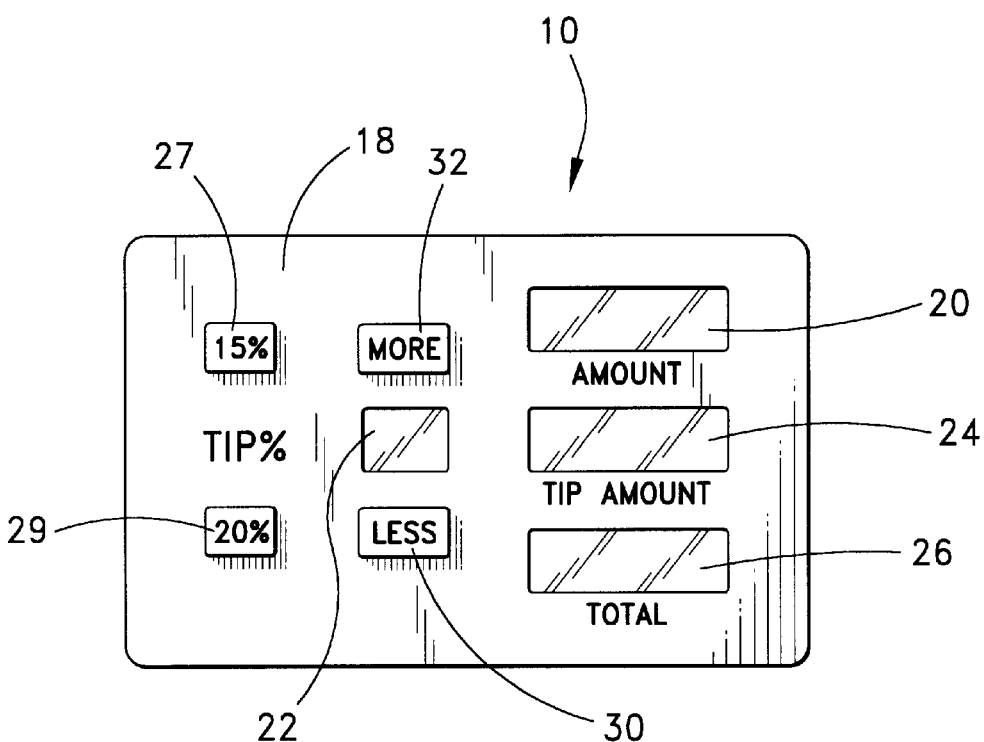
FIG. 2 is a bottom plan view of the calculating device.

FIG. 2 provides a plan view of the second side 18 of the calculating device 10. The second side 18 contains fifth 27, sixth 29, seventh 30, and eighth 32 calculating device control means for controlling the operation of the calculating device 10. The second side 18 also contains additional display screens for providing output from the processor circuitry to the operator. A second side AMOUNT display screen 20 is included on the second side 18 and displays the same amount as entered on the first side 12. The fifth 27 and sixth 29 control means preferably comprise buttons as found on the first side 12. The fifth 27 and sixth 29 control means are preferably assigned predetermined numeric percentage values. The fifth 27 and sixth 28 control means, when actuated, signal the processor circuitry to calculate the chosen predetermined percentage of the numeric value entered by the user on the first side 12 and displayed on the first side AMOUNT display screen 14 and the second side AMOUNT display screen 20. In the invention's preferred embodiment the preprogrammed percentage amounts are fifteen (15) percent and twenty (20) percent, those being the most common percentage values to leave for the service provider as a gratuity. However, other percentage amounts may be used, as will be easily understood by those skilled in the art.

Also located on the second side 18 is a seventh 30 and eighth 32 control means which allow the user to alter the percentage value in integer increments. Preferably, the seventh control means 30 is labeled LESS and the eighth control means 32 is labeled MORE although various labels could be applied as known by those with skill in the art. The user may actuate the eighth selection means 32 or the seventh selection means 30 to increase or decrease, respectively, the percentage value in one integer increments. A PERCENTAGE VALUE display screen 22 displays the percentage value that the processor circuitry will use in the computation.

A TIP AMOUNT display screen 24 displays the percent amount, calculated by the processor circuitry, based on the operator entered data. This value will vary as the operator alters the percentage amount using the eighth control means 32, labeled MORE, the seventh control means 30, labeled LESS, or the preprogrammed percentage control means 27, 29.

The processor circuitry sums the values displayed in the second side AMOUNT display screen 20 and the TIP AMOUNT display screen 24 and displays the sum in the TOTAL display screen 26.

A method of using the calculating device 10 is as follows. An operator, such as a waiter, cashier or the like, turns on the device by pressing the "ON" control means or button 2. The displays and memory of the device 10 are cleared by pressing the CLEAR control means or button 6.

Next, the operator enters a data amount into the memory, which amount is displayed on the displays 14, 20. The operator enters the data using the data entry means 8. This amount entered may correspond to the cost of a meal or other goods or services or the like.

The device 10 is then provided to the customer. This device 10 may advantageously be provided in a folder 28 (as illustrated in FIG. 3) or on a tray or the like. The device 10 is provided with the second side 18 facing up. As noted previously, the ledge 16 surrounding the first side 12 prevents the various buttons from contacting the folder, tray or other support surface.

The customer then enters the desired tip amount and a total of the amount entered by the first party plus the tip. The customer enters the tip amount by pressing either of the preprogrammed percentage keys 27, 29. The customer may alter this tip amount by pressing the "MORE" or "LESS" keys 30, 32. The current tip amount is continuously displayed in the display 22.

Once the customer has entered the desired tip amount, this tip amount is displayed in the tip amount display 24, along with a total amount in a display 26. The customer may then provide payment of the desired amount and return the device 10 to the operator.

After use, the memory and displays of the device 10 may be cleared by pressing the "CLEAR" button 6 and a new amount entered, or the device 10 may be turned off by depressing control means or button 4.

While the above-described device 10 has been described as arranged to calculate a percentage of an entered value, the device 10 may be arranged to calculate any number of values based on the entered value.

Of course, the foregoing description is that of preferred embodiments of the invention, and various changes and modifications may be made without departing from the spirit and scope of the invention, as defined by the appended claims.

What is claimed is:

1. A calculating device for use in calculating a tip amount comprising:
    a housing having a first side and a second side;
    a control unit positioned within said housing;
    at least one control positioned on said first side of said housing for entering a first value, said first side of said housing adapted to prevent said at least one control on said first side of said housing from being activated when said housing is supported by its first side;
    at least one control positioned on said second side of said housing for causing said control unit to calculate a percentage value of said first value; and
    a display positioned on said second side of said housing for displaying said percentage value.

2. The device in accordance with claim 1, wherein a ledge extends outwardly from said first side of said housing beyond said at least one control positioned on said first side of said housing.

3. The device in accordance with claim 1, wherein said at least one control positioned on said first side of said housing comprises a numeric keypad.

4. The device in accordance with claim 1, further including a display on said first side of said housing for displaying said first value.

5. The device in accordance with claim 1, further including a display for displaying an amount equal to said first value plus said percentage value.

6. The device in accordance with claim 1, wherein said at least one control positioned on said second side of said housing includes at least one percentage key for causing a predetermined percentage value to be calculated.

7. The device in accordance with claim 6, further including at least one key for causing said predetermined percentage value to be changed.

8. The device in accordance with claim 1, further including a display positioned on said first side of said housing for displaying said first value.

9. A method of calculating a tip amount with a device having a first side, a second side, at least one control positioned on said first side, at least one control positioned on said second side, and a processor unit, comprising the steps of:
    entering a first amount into said processor unit with said at least one control positioned on said first side;
    turning said device over to said second side;
    engaging said at least one control on said second side;
    calculating a second amount based upon said first amount with said processor unit; and
    displaying said second amount on said display on said second side.

10. The method in accordance with claim 9, further comprising the step of supporting said device when said device is turned to said second side in a manner whereby said at least one control on said first side is not engaged.

11. The method in accordance with claim 9, wherein said calculating step comprises the step of calculating a percentage of said first amount.

12. The method in accordance with claim 9, further including the steps of calculating a third amount by adding said first amount to said second amount and displaying said third amount on said second side.

13. A calculating device comprising:
    a housing having a first side and a second side;
    means for calculating positioned within said housing;
    means for controlling positioned on said first side of said housing for controlling said means for calculating;
    means for controlling positioned on said second side of said housing for controlling said means for calculating; and
    display means positioned on said second side of said housing.

14. The device in accordance with claim 13, wherein said means for controlling positioned on said second side includes at least one button for causing said means for calculating to calculate a value entered with said means for controlling positioned on said first side.

15. The device in accordance with claim 13, further including display means positioned on said first side of said housing.

16. A calculating device comprising a housing having a first side, a second side, a processor unit positioned at least partly within said housing, at least one key member positioned on said first side, at least one key member positioned on said second side, a display positioned on at least said second side, and means for preventing said at least one key member on said first side from being activated when said housing is supported by said first side, wherein said at least one key member positioned on said second side comprises a key for causing said processor unit to calculate a value based upon a value entered with said at least one key member positioned on said first side.

17. The device in accordance with claim 16, wherein said means for preventing comprises a member extending outwardly from said first side of said housing beyond said at least one key member on said first side.

* * * * *